L. T. CONANT.
Automatic Buggy-Brake.
No. 106,555. Patented August 23, 1870.
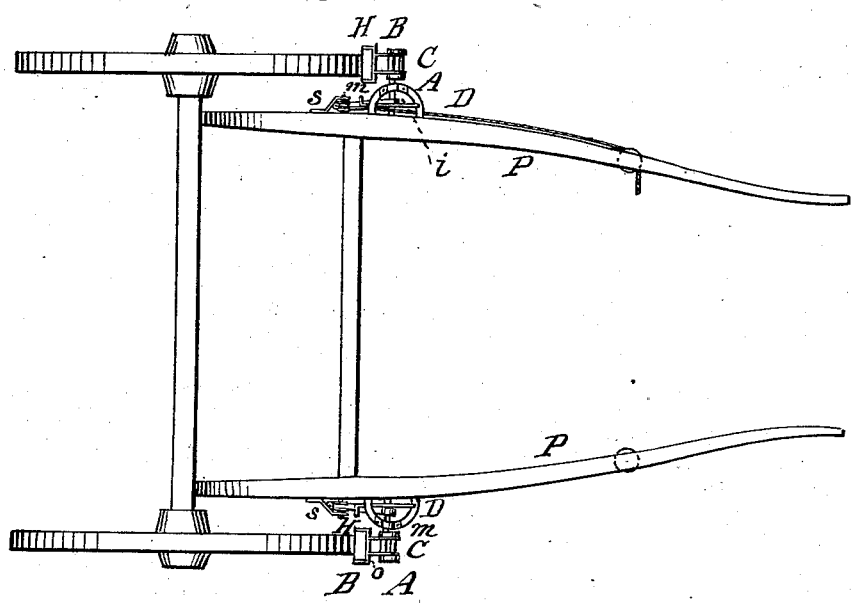
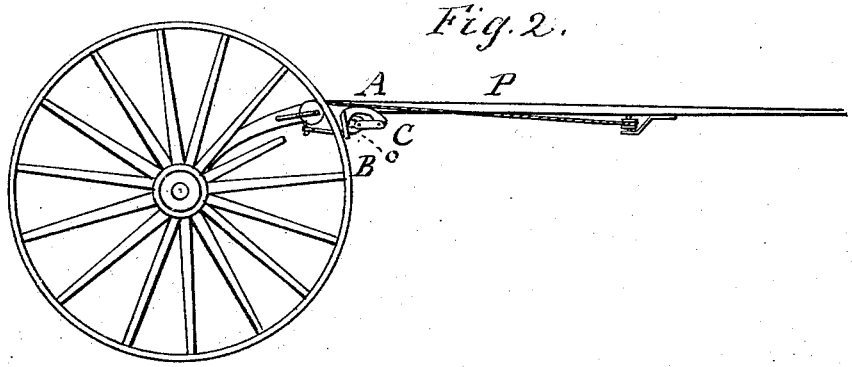
Witnesses
Inventor
Leander T. Conant

United States Patent Office.

LEANDER T. CONANT, OF NEW LISBON, OHIO.

Letters Patent No. 106,555, dated August 23, 1870.

IMPROVED AUTOMATIC BUGGY-BRAKE.

The Schedule referred to in these Letters Patent and making part of the same.

*To all whom it may concern:*

Be it known that I, LEANDER T. CONANT, of New Lisbon, in the county of Columbiana and State of Ohio, have invented a new and useful Automatic Buggy-Brake; and I do hereby declare that the following is a full and accurate description thereof, reference being had to the accompanying drawing and to the letters of reference marked thereon.

The nature of my invention consists in providing the horse with the means of applying the break at the proper time, and in an effectual manner, with little or no inconvenience to the horse.

Figure 1 is a bird's eye view, exhibiting the various parts of the improvement in combination, attached to the shaft of a buggy, and ready to be used.

Figure 2 is a drawing exhibiting the several parts of my improvement detached.

P P, buggy-shafts.
A A, lock-bars.
B B and C C, combined, form my rubber-block.
H H, flanges on rubber-block.
D D, levers.
M M, semicircles.
S S, pulleys.
I I, springs for levers.
O O, springs for rubber-blocks.

I provide the shafts of an ordinary buggy with semicircles M M attached to the shafts with bolts, which circles serve as bearings for the lock-bars A A, as seen in fig. 2. The lock-bars are bent down and out at their outer ends, and near their inner ends are attached levers D D, at or near right angles to lock-bars.

I provide the outer ends of the lock-bars A A with rubber blocks, formed of two parts, B B and C C, as seen in fig. 1. The blocks B B are provided with flanges H H, to receive and hold leather or any other substance used as friction-rubbers.

I provide rubber-blocks B B with coiled springs O O, to throw them back to their places after being displaced by backing the buggy. I also provide levers D D with springs I I to force rubber-blocks B B back from the wheels when not in use.

I further provide shafts with pulleys S S, around which pass the ordinary hold-back straps, and attach to levers D D. Now, it is evident that, as the buggy forces itself against the horse in descending the hill, the hold-back straps, by drawing upon levers D D, will rotate lock-bars A A, so that rubber-blocks B B will be forced against the buggy-wheels, thereby supplying the horse with a self-acting brake, whereby he is enabled to descend the steepest hills with perfect safety and comparative ease.

I would here remark that there are other methods of lever power which can be nearly as beneficially applied as the one just described.

Having described the structure of my improvement and some of the benefits resulting therefrom, I proceed to remark, First, I do not claim to have invented lock-bars nor rubber-blocks, with their flanges, nor levers, nor springs, nor pulleys, as such, and disconnectedly used. Nor do I claim the use of any of the parts just named except for the purposes herein set forth, and as forming necessary and different parts of the lock in its combination.

What I do claim as new and of my own invention, and which I seek to secure by Letters Patent of the United States, is as follows:

Semicircles M M, lock-bars A A, rubber-blocks B B and C C, with their flanges H H, levers D D, pulleys S S S S, springs I I and O O, as arranged in their combination, with their attachment to shafts P P, in the manner hereinabove described, and for the purposes substantially as herein set forth.

LEANDER T. CONANT.

Witnesses:
HARVEY MENISON,
G. WALLACE.